United States Patent
Choi et al.

(10) Patent No.: US 8,326,477 B2
(45) Date of Patent: Dec. 4, 2012

(54) HEEL AND TOE DRIVING ON FUEL CELL VEHICLE

(75) Inventors: Tayoung Choi, Rochester, NY (US); Dongmei Chen, Austin, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/713,722

(22) Filed: Feb. 26, 2010

(65) Prior Publication Data

US 2011/0213516 A1    Sep. 1, 2011

(51) Int. Cl.
*G06F 19/00* (2011.01)
(52) U.S. Cl. .......................... 701/22; 903/944
(58) Field of Classification Search .............. 701/22, 701/48, 70, 110, 112; 429/433, 444; 180/65.275, 180/65.31, 205.1, 65.1, 65.26; 903/944–946
See application file for complete search history.

(56) References Cited

U.S. PATENT DOCUMENTS

| | | | | |
|---|---|---|---|---|
| 4,363,999 A * | 12/1982 | Preikschat | ................... | 318/53 |
| 5,091,857 A * | 2/1992 | Katayama et al. | ........... | 701/112 |
| 6,292,719 B1 * | 9/2001 | Seto et al. | ................... | 701/1 |
| 2006/0213712 A1 * | 9/2006 | Mayne | ................... | 180/205 |
| 2007/0223727 A1 * | 9/2007 | Kobayashi et al. | ........ | 381/86 |
| 2011/0313606 A1 * | 12/2011 | Yoshida et al. | ............ | 701/22 |

* cited by examiner

*Primary Examiner* — Thomas Black
*Assistant Examiner* — Marthe Marc-Coleman
(74) *Attorney, Agent, or Firm* — John A. Miller; Miller IP Group, PLC

(57) ABSTRACT

A system and method for providing nearly instantaneous power in a fuel cell vehicle. The method includes monitoring the brake pedal angle and the accelerator pedal angle of the vehicle, and if the vehicle driver is pressing both the brake pedal and the accelerator pedal at the same time and the vehicle is in a drive gear, activating a heel and toe mode. When the heel and toe mode is activated, the speed of a cathode compressor is increased to a predetermined speed set-point, which is higher than the normal compressor speed for the pedal position. Thus, when the vehicle brake is removed, the compressor speed is high enough to provide enough air to the cathode, so that the stack can generate nearly immediate power.

15 Claims, 2 Drawing Sheets

HEEL AND TOE DRIVING ON FUEL CELL VEHICLE

GOVERNMENT CONTRACT

The U.S. Government may have a paid-up license in this invention and the right in limited circumstances to require the patent owner to license others on reasonable terms as provided for by the terms of a Government Contract/Project awarded by the U.S. Department of Energy.

BACKGROUND OF THE INVENTION

1. Field of the Invention

This invention relates generally to a system and method for providing an increased power response time in a fuel cell vehicle and, more particularly, to a system and method for providing an increased power response time in a fuel cell vehicle by maintaining a high compressor speed while the vehicle brakes are being applied.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

For certain vehicle operations, it is desirable that the vehicle provide high performance by minimizing the throttle response time, i.e., the time from when the vehicle operator requests power from the fuel cell stack to when the fuel cell stack is able to deliver the power. As is well understood in the art, there is a certain lag between when power is requested from the fuel cell stack in a fuel cell system until when the fuel cell stack is able to deliver the power. For example, the compressor that provides the cathode air to the cathode side of the fuel cell stack is limited in its ability to immediately provide enough air when high power is commanded from the fuel cell stack. A centrifugal air compressor typically used in a fuel cell system has a slower transient characteristic than the hydrogen injector for the anode side. For a 93 kW net power fuel cell stack, it takes about 1.2 seconds to increase the speed of the compressor from idle (20,000 RPM) to full power operation (80,000 RPM).

Not only is there an inherent lag time while the compressor spools up to the desired speed, the power from the fuel cell stack is also selectively distributed between the traction system of the vehicle and the compressor to provide the cathode air.

A driver who is familiar with an internal combustion engine vehicle may push the vehicle accelerator while waiting for a traffic signal or keep pushing the vehicle accelerator pedal while reducing the speed of the vehicle at a corner. However, with the current control strategy for a fuel cell vehicle, the speed set-point of the air compressor will be decreased. Consequently, after the driver releases the vehicle brake pedal, the fuel cell power system cannot deliver high power instantaneously.

SUMMARY OF THE INVENTION

In accordance with the teachings of the present invention, a system and method are disclosed for providing near instantaneous power in a fuel cell vehicle. The method includes monitoring the brake pedal angle and the accelerator pedal angle of the vehicle, and if the vehicle driver is pressing both the brake pedal and the accelerator pedal at the same time and the vehicle is in a drive gear, activating a heel and toe mode. When the heel and toe mode is activated, the speed of a cathode compressor is increased to a predetermined speed set-point, which is higher than the normal compressor speed for the pedal position. Thus, when the vehicle brake is removed, the compressor speed is high enough to provide enough air to the cathode, so that the stack can generate nearly immediate power.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for activating a heel and toe mode in a fuel cell system vehicle to provide near instantaneous stack power is merely exemplary in nature, and is in no way intended to limit the invention or its applications or uses.

Figure 1:
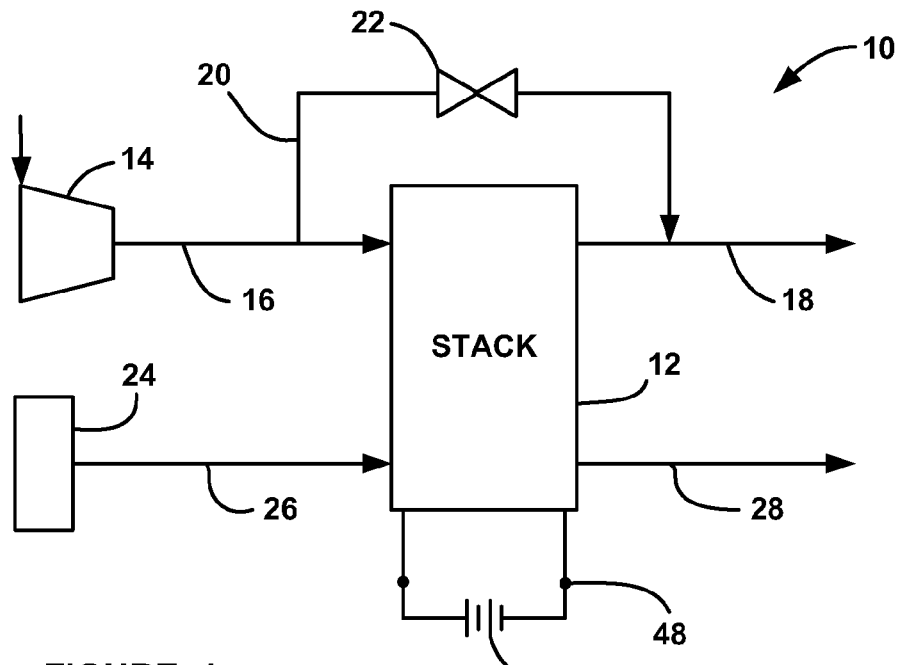
FIG. 1 is a schematic block diagram of a fuel cell system.

FIG. 1 is a schematic block diagram of a fuel cell system 10 suitable for a fuel cell or fuel cell hybrid vehicle. The system 10 includes a fuel cell stack 12. Cathode air is provided to the cathode side of the fuel cell stack 12 by a compressor 14 on a cathode input line 16. Cathode exhaust is output from the stack 12 on a cathode exhaust gas line 18. The cathode air can by-pass the stack 12 on a by-pass line 20 through a by-pass valve 22. Hydrogen gas fuel is provided to the anode side of the fuel cell stack 12 from a hydrogen source 24 on an anode input line 26, and is output from the fuel cell stack 12 on an anode output line 28. The system 10 also includes a high voltage battery 46 electrically coupled to the system 10 through appropriate devices 48, such as switches and voltage converters, as would be well understood to those skilled in the art.

According to the invention, the fuel cell system 10 is on a fuel cell vehicle and can be operated in a heel and toe mode where stack power can be almost instantaneously provided. In the heel and toe mode, the speed of the compressor 14 is maintained relatively high during certain times when the stack 12 is not providing power so that when the vehicle driver wants stack power very quickly, such as for high performance purposes, cathode air is quickly provided to the stack 12.

Figure 2:
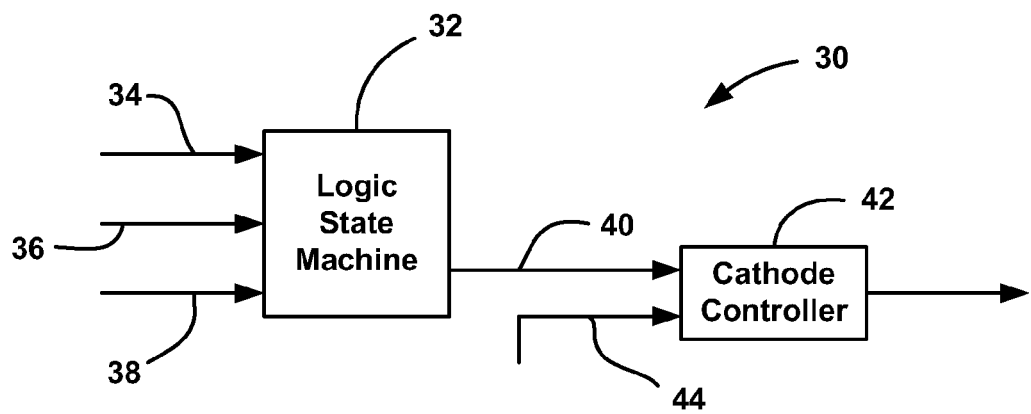
FIG. 2 is a schematic block diagram of a control system for activating a heel and toe mode for the fuel cell system shown in FIG. 1.

FIG. 2 is a block diagram of a control system 30 that provides control of the system 10 for the heel and toe mode. The control system 30 includes a logic state machine 32 that receives three input signals from suitable sensors (not shown) or other suitable devices. Those inputs include the gear position of the vehicle, referred to as PRNDL, on line 34, the angle of the vehicle brake pedal on line 36 and the angle of the vehicle acceleration pedal on line 38. If the vehicle is in a forward drive gear and the brake pedal and the acceleration pedal are being pressed at the same time so they both exceed some predetermined angle threshold, then the logic state machine 32 provides a heel and toe mode control signal on line 40. A cathode controller 42 receives the control signal on line 40 and a compressor speed set-point signal on line 44, and outputs a command to the compressor 14 in response thereto that sets the speed of the compressor 14 at the predetermined compressor speed set-point based on the accelerator pedal angle, for example, between 40,000 and 80,000 RPMs, when the heel and toe mode is activated.

In the heel and toe mode, the compressor 14 will be rotating at a relatively high speed so that the stack 12 can receive cathode air relatively instantaneously, if desired. Thus, if the driver releases the brake pedal so that only the acceleration pedal is pressed, and possibly provides additional acceleration pedal angle, hydrogen from the hydrogen source 24 will be provided to the stack 12 relatively quickly so that the stack 12 will generate power from the combination of the air and hydrogen now being sent thereto. Because the high volume of air from the compressor 14 will have a drying effect on the membranes within the stack 12, it may be desirable to open the by-pass valve 22 while the system 10 is in the heel and toe mode so that the air is not forced through the stack 12, which also causes not only the compressor 14 to work harder, but also the stack operation stoichiometry to change. Because the valve 22 can be closed instantaneously, this will not have an effect on how fast power can be provided from the stack 12.

Figure 3:
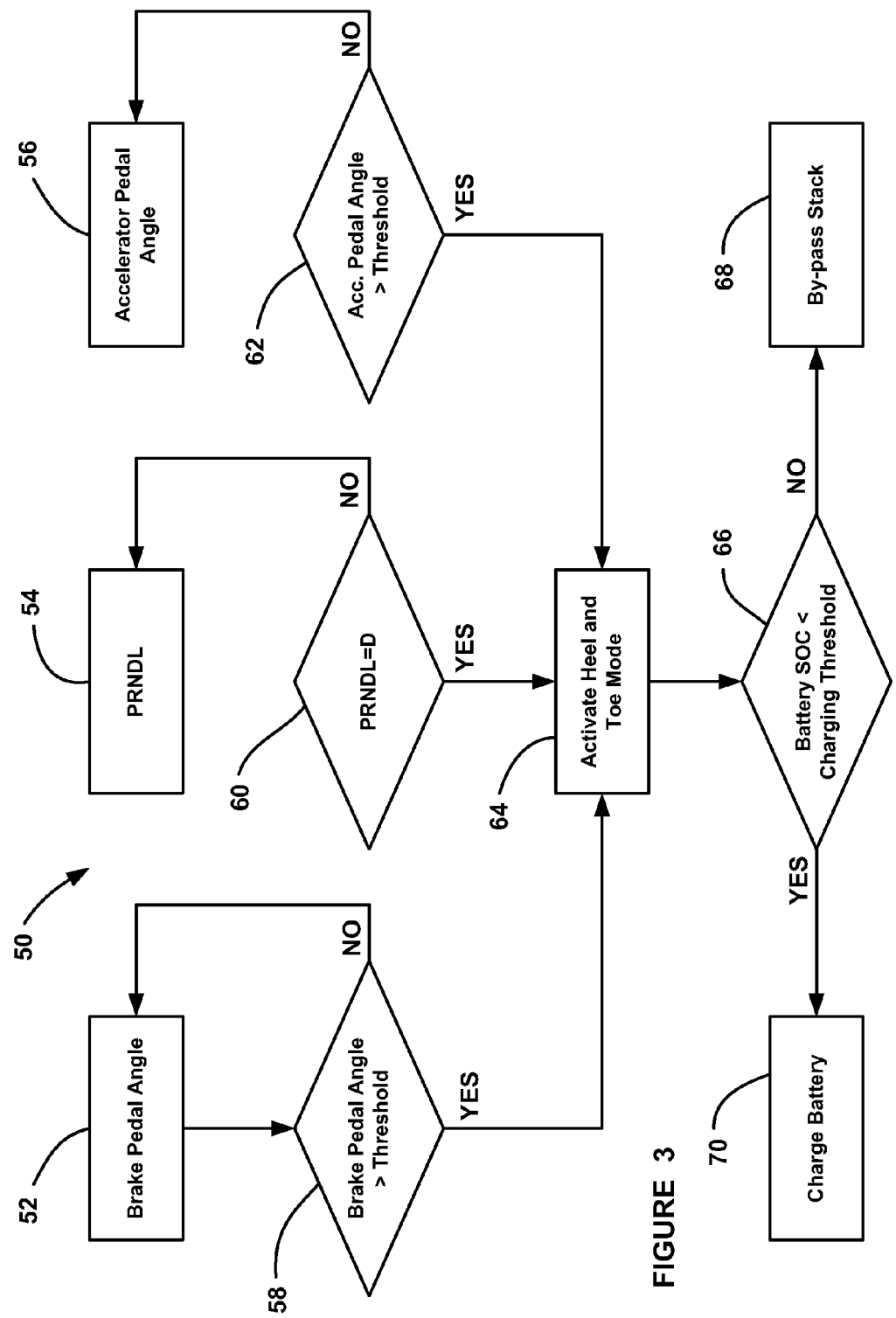
FIG. 3 is a flow chart diagram showing a process for activating the heel and toe mode.

FIG. 3 is a flow chart diagram 50 showing a method for activating the heel and toe mode, as discussed above. The brake pedal angle is determined at box 52, the vehicle gear is determined at box 54 and the acceleration pedal angle is determined at box 56. The algorithm determines whether the brake pedal angle exceeds a predetermined threshold at decision diamond 58, determines whether the vehicle gear is in drive at decision diamond 60 and determines whether the accelerator pedal angle exceeds a predetermined threshold at decision diamond 62. The brake pedal angle threshold and the acceleration pedal angle thresholds can be calibrated for different vehicles, for different types of driving and for different drivers. If all three of these conditions are met, then, as discussed above, the algorithm puts the vehicle in the heel and toe mode at box 64, and the compressor speed is increased to the predetermined compressor set-point, as discussed above.

The battery 46 is charged by the fuel cell stack 12 and discharged by use during operation of the system 10 based on a certain control process. It is desirable to maintain the state of charge (SOC) of the battery 46 within some predetermined range. According to another aspect of the invention, the algorithm determines whether the SOC of the battery 46 is less than a predetermined charge threshold at decision diamond 66. If the battery SOC is below the charge threshold, then the battery 46 needs to be charged. Thus, in the heel and toe mode the control algorithm can cause the compressor 14 to speed up to the set-point and the cathode air to be sent to the stack 12 along with hydrogen gas from the source 24 so that the stack 12 generates power that can be used to charge the battery 46. If, however, the battery SOC is greater than the charge threshold at the decision diamond 66, then the battery 46 does not need to be charged. Thus, the compressor speed is set to the predetermined set-point, but the by-pass valve 22 is opened so that the compressor air by-passes the stack 12, as discussed above.

The heel and toe mode offers a number of advantages and benefits. For example, it improves fuel cell vehicle performance, provides faster delivery of highly transient power requests, provides flexibility on service and increases vehicle performance reputation.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for activating a heel and toe mode in a fuel cell vehicle, said method comprising:
   determining whether the vehicle is in a drive gear;
   determining whether a brake pedal angle of a brake pedal of the vehicle is greater than a predetermined brake pedal angle threshold;
   determining whether an acceleration pedal angle of an acceleration pedal of the vehicle is greater than a predetermined acceleration pedal angle threshold; and
   activating the heel and toe mode if the vehicle is in the drive mode, the brake pedal is greater than the brake pedal angle threshold and the acceleration pedal is greater than the acceleration pedal angle threshold where the heel and toe mode causes the speed of a compressor that provides cathode air to the cathode side of the fuel cell stack to be increased to a predetermined set-point.

2. The method according to claim 1 further comprising causing the cathode air to by-pass the stack when the vehicle is in the heel and toe mode.

3. The method according to claim 2 wherein the cathode air by-passes the fuel cell stack if a battery state of charge is greater than a charge threshold.

4. The method according to claim 1 further comprising using the cathode air and hydrogen gas to provide stack power when the vehicle is in the heel and toe mode to charge a battery if the battery state of charge is less than a charge threshold.

5. The method according to claim 1 wherein the compressor set-point speed is between 40,000 and 80,000 RPMs.

6. The method according to claim 1 further comprising providing nearly instantaneous stack power when the heel and toe mode is activated and the brake pedal is released.

7. A method for activating a heel and toe mode in a fuel cell vehicle, said method comprising:
   determining whether the vehicle is in a drive gear;
   determining whether a brake pedal angle of a brake pedal of the vehicle is greater than a predetermined brake pedal angle threshold;
   determining whether an acceleration pedal angle of an acceleration pedal of the vehicle is greater than a predetermined acceleration pedal angle threshold;
   activating the heel and toe mode if the vehicle is in the drive mode, the brake pedal is greater than the brake pedal angle threshold and the acceleration pedal is greater than the acceleration pedal angle threshold where the heel and toe mode causes the speed of a compressor that provides cathode air to the cathode side of the fuel cell stack to be increased to a predetermined set-point, wherein the cathode air by-passes the stack when the vehicle is in the heel and toe mode; and
   providing nearly instantaneous stack power when the heel and toe mode is activated and the brake pedal is released.

8. The method according to claim 7 wherein the cathode air only by-passes the fuel cell stack if a battery state of charge is greater than a charge threshold.

9. The method according to claim 8 further comprising using the cathode air and hydrogen gas to provide stack power when the vehicle is in the heel and toe mode to charge a battery if the battery state of charge is less than a charge threshold.

10. The method according to claim 7 wherein the compressor set-point speed is between 40,000 and 80,000 RPMs.

11. A fuel cell system for a vehicle, said system comprising:
   a fuel cell stack;
   a compressor providing cathode air to a cathode side of the fuel cell stack;
   a state machine responsive to a signal identifying whether a brake pedal angle of a brake pedal of the vehicle is greater than a predetermined brake pedal angle threshold, a signal identifying whether an acceleration pedal angle of an acceleration pedal of the vehicle is greater than a predetermined acceleration pedal angle threshold and a signal identifying whether the vehicle is in a drive gear, said state machine activating a heel and toe mode if the vehicle is in the drive mode, the brake pedal is greater than the brake pedal angle threshold and the acceleration pedal is greater than the acceleration pedal angle threshold; and
   a cathode controller responsive to a heel and toe mode activation signal from the state machine and a compressor speed set-point, said cathode controller causing the speed of the compressor to be increased to the compressor speed set-point in response to the activation signal.

12. The system according to claim 11 further comprising a cathode by-pass valve, said cathode controller causing the cathode air to by-pass the stack through the by-pass valve when the vehicle is in the heel and toe mode.

13. The system according to claim 12 wherein the cathode controller causes the cathode air to by-pass the fuel cell stack if a battery state of charge is greater than a charge threshold.

14. The system according to claim 11 wherein the cathode controller uses the cathode air and hydrogen gas to provide stack power when the system is in the heel and toe mode to charge a battery if the battery state of charge is less than a charge threshold.

15. The system according to claim 11 wherein the system provides nearly instantaneous stack power when the heel and toe mode is activated and the brake pedal is released.

\* \* \* \* \*